United States Patent [19]
Cooper

[11] 3,823,975
[45] July 16, 1974

[54] MOTORCYCLE TRAILER AND CAMPER
[76] Inventor: Gene W. Cooper, 915 E. Southern Ave., Phoenix, Ariz. 85040
[22] Filed: Aug. 20, 1973
[21] Appl. No.: 389,700

[52] U.S. Cl. ............................................. 296/23 R
[51] Int. Cl. ............................................. B60r 7/02
[58] Field of Search............ 296/23 R; 135/1 A, 4 A

[56] References Cited
UNITED STATES PATENTS

| | | | |
|---|---|---|---|
| 2,497,597 | 2/1950 | Gatewood | 296/23 R |
| 2,567,516 | 9/1951 | Jones | 296/23 R |
| 2,582,635 | 1/1952 | Kipple | 296/23 R |
| 3,065,019 | 11/1962 | May | 296/23 R |

*Primary Examiner*—Allen N. Knowles
*Assistant Examiner*—Thomas E. Kocovsky
*Attorney, Agent, or Firm*—John A. Robertson

[57] ABSTRACT

This specification discloses a trailer intended primarily for attachment to a motorcycle and which includes facilities which adapt it for use as a camper. The trailer comprises two box-like parts. The lower part consists of a bottom, side walls, a front wall and a tailgate. The upper box-like part comprises a top, side walls, a front wall, the lower edge of which is hingedly connected to the upper edge of the front wall of the lower part, and a rear wall. Seals are provided between the meeting edges of the side walls and the lower edge of the rear wall of the upper member and the tailgate. A platform is hingedly mounted on the rear edge of the bottom of the lower box-like member and carries two pairs of collapsible legs at the opposite ends thereof and a pivotally mounted vertical support. A pair of telescopic arms are pivotally mounted at the lower edge of the rear wall of the upper member and when extended are connected to the vertical support. A canopy in rolled form is stored in the upper member and when unfurled is secured in draped position over the extended telescopic arms and vertical support by snap fasteners.

A pair of leaf springs are secured to the bottom of the lower member and carry wheels at their free ends. A tongue extends forwardly from the front wall of the lower member and carries a hitch at its front end. Cooperating elements of a detachable connection are mounted on the tongue and top wall of the upper member to hold the upper member in an upraised, inclined position relative to the bottom member.

10 Claims, 4 Drawing Figures

PATENTED JUL 16 1974

PATENTED JUL 16 1974

MOTORCYCLE TRAILER AND CAMPER

The present invention relates to trailer campers and is concerned primarily with a trailer which is particularly designed for attachment to a motorcycle and which includes facilities for adapting it for use as a camper.

BACKGROUND OF THE INVENTION

At the present time the use of trailers and trailer campers is becoming more and more widespread. Just about all of the trailer campers now available to the using public are intended to be hitched onto a motor vehicle, such as an automobile or pickup truck. Many of these trailers include structure which adapt them for use as a camper. It may be stated as a general rule that such structures are folded into a compact condition into the trailer when the latter is to be towed and are subsequently opened up into an erected position in which they afford sleeping quarters for the passengers in the vehicle.

Inasmuch as most motor vehicles are designed to accommodate more than two passengers, the trailer campers ordinarily have sleeping quarters for passengers in excess of two. Thus, they are extensive and complex structures which require considerable effort for their erection and restoration to a compact condition.

A motorcycle ordinarily carries either one or two riders. Thus, the present invention is founded on the concept of providing a trailer camper for a motorcycle which is originally designed to provide sleeping facilities for either one or two persons.

While trailers now available are normally supported by either two or four wheels, with leaf springs interposed between the wheels and the trailer chassis, the size and weight of such trailers require the use of complicated leaf springs. Thus, usually there are two bowed leaf springs in confronting relation for each wheel. It is believed extremely desirable to provide a simpler leaf spring construction.

Most of the trailer campers now available are not for cargo carrying purposes alone. Thus, the mechanism and structure which provides sleeping quarters are not ordinarily easily removable so as to render available the complete interior of the trailer for cargo carrying purposes.

OBJECTS OF THE INVENTION

With the foregoing conditions in mind, the present invention has in view the following objectives:

1. To provide a trailer which is particularly adapted for attachment to a motorcycle and which includes facilities which constitute the trailer a camper.
2. To provide a trailer of the type noted in which the facilities for converting it to a camper are removable to adapt the trailer for use as a cargo carrier.
3. To provide a trailer of the character aforesaid which is supported by a pair of single arm leaf springs having wheels at their lower free ends.
4. To provide a trailer camper of the kind described which comprises a pair of box-like members which are hingedly connected at their forward ends.
5. To provide, in a trailer camper of the type noted, a lower box-like member comprising a bottom, side walls, a front wall and a tailgate hingedly connected to the bottom at the rear edge thereof, together with an upper box-like member comprising a top, side walls, a front wall hingedly connected at its lower edge to the upper edge of the front wall of the lower member, and a rear wall.
6. To provide, in a trailer camper of the character aforesaid, structure providing seals between the meeting edges of the side walls and the lower edge of the rear wall of the top member and the upper edge of the tailgate when the box-like members are in closed position.
7. To provide, in a trailer camper of the kind described, a platform which is hingedly mounted at the rear edge of the bottom of the lower member and which carries collapsible legs at the front and rear ends thereof and a collapsible vertical support.
8. To provide, in a trailer camper of the type aforesaid, an upper member having a pair of telescopic arms pivotally connected to the lower corners thereof and which when extended are connected to the upper end of the vertical support.
9. To provide, in a trailer camper of the character noted, means for securing a canopy in rolled form and a rolled pad in the upper box-like member.
10. To provide, in a trailer camper of the kind described, means for securing the upper box-like member in a partially raised or tilted position relative to the bottom member.

Various other more detailed objects and advantages of the invention, such as arise in connection with carrying out the above ideas in a practical embodiment, will in part become apparent, and in part be hereinafter stated as the description of the invention proceeds.

SUMMARY OF THE INVENTION

The foregoing objects are achieved by providing a trailer camper consisting essentially of two hingedly connected box-like members. The lower member comprises a bottom, a front wall, side walls and a tailgate hingedly connected to the rear edge of the bottom. A tongue is secured to the front wall and carries a hitch in the form of a universal joint at its free end which is adapted to be attached to a motorcycle. A pair of spring arms are secured to the underside of the bottom and extend downwardly and rearwardly therefrom, with a wheel being secured to the lower free end of each arm.

A platform having an extent substantially the same as that of the bottom is hingedly connected to the rear edge of the bottom. Two pairs of legs are pivotally secured to the platform at the front and rear ends thereof and are adapted to be swung into a compact condition against the platform. A vertical support is pivotally mounted on the rear end of the platform and is adapted to assume either a collapsed position against the platform or an erected vertical position.

The upper box-like member comprises a top, side walls and a front wall, which is integral with the top and connected thereto by a bend, and the lower edge of which is hingedly connected to the upper edge of the front wall of the lower member. One element of a detachable connection is secured to the bend and the complemental element of such a connection is secured to the tongue. When these elements are connected, the upper member is secured in a partially upraised or inclined position relative to the lower member.

The upper member also includes a rear wall and a pair of telescopic arms are pivotally mounted at the opposite ends of the lower edge of the rear wall and are adapted to be collapsed and then folded into a compact position within the upper member. When extended, the free ends of these arms are connected to the upper ends of the vertical support when the latter are extended.

A canopy is stored in rolled position within the upper member and secured therein by a pair of retaining straps. When this canopy is unfurled, portions thereof are secured to the inner sides of the side walls of the upper member, along the lower edges thereof, and the canopy is draped over the extended telescopic arms and the vertical support. The lower edges of the canopy are secured to the exterior of the side walls of the lower member along the lower edges thereof, and the side and end edges of the platform when extended. The canopy is secured in this position by snap fasteners.

A pad of foam rubber or the like is also stored in rolled condition within the upper member by a pair of elastic straps and when unrolled, assumes a position over the bottom of the lower member and the platform when the latter is opened into effective position.

For a full and more complete understanding of the invention, reference may be had to the following description of the accompanying drawings wherein.

DESCRIPTION OF THE PREFERRED EMBODIMENT

Figure 1:
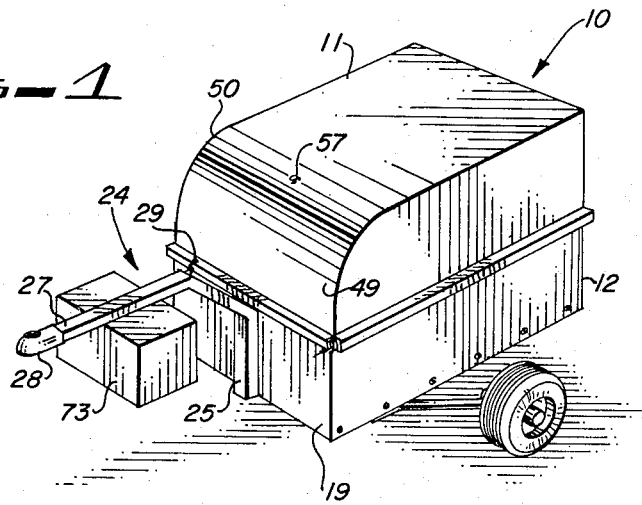
FIG. 1 is a perspective of the motorcycle trailer and camper of this invention in closed position and with the motorcycle omitted.

Referring now to the drawings wherein like reference characters denote corresponding elements throughout the several views, and first more particularly to FIG. 1, the trailer camper of this invention is designated generally 10 and comprises two basic elements which are an upper box-like member 11 and a lower box-like member 12.

Figures 3, 4:
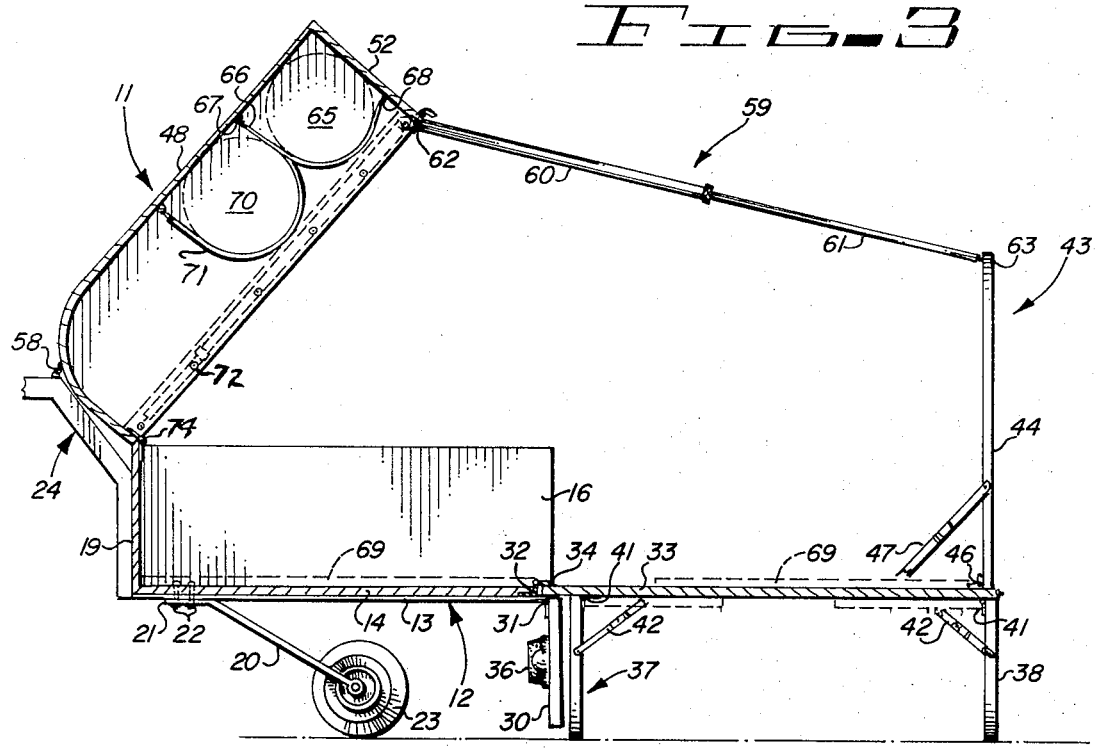
FIG. 3 is a longitudinal, vertical section through the trailer camper as opened and the various parts in erected or effective position, being taken on the plane of the line 3—3 of FIG. 2.
FIG. 4 is a perspective depicting the elements of the trailer in exploded relation, with the legs and vertical support on the platform collapsed.

As shown more particularly in FIGS. 3 and 4, lower member 12 comprises a laminated bottom wall consisting of an outer layer 13 of aluminum and an upper layer 14 of plywood. The outer aluminum layer 13 is bent upwardly along edges 15 to provide vertical side walls 16. Side walls 16 are bent outwardly at their top edges to provide substantialy horizontal flanges 17 which terminate in downturned lips 18. A front wall 19 upstands from the front edge of the bottom, being preferably formed integrally therewith, and has side edges which are secured to the front edges of side walls 16 in any preferred manner, as by metal fusion.

Secured to the underface of the bottom, that is to the aluminum layer 13, are a pair of spring arms 20 (only one of which is illustrated), there being one at each side. Each spring arm 20 has a flat end portion 21 which is secured to bottom 13–14 as by rivets 22. Arms 20 extend rearwardly and downwardly and rotatably mounted on the lower free end of each arm in a well known manner is a wheel 23.

As shown more clearly in FIGS. 1 and 4, a tongue designated generally 24 has a vertical end portion 25 secured to the outer face of front wall 19, a forwardly extending inclined portion 26, and a horizontal portion 27, which carries a trailer hitch 28 at its forward end. Trailer hitch 28 is of the universal joint type which accommodates canting or tilting of the motorcycle to which it is secured relative to the trailer 10. Hitches of this type are not well known and available to the public; hence, the details thereof are not herein illustrated. At the joinder of the tongue sections 26 and 27, tongue 24 is provided with a hook 29 which constitutes one element of a detachable connection to be later described.

Figure 2:
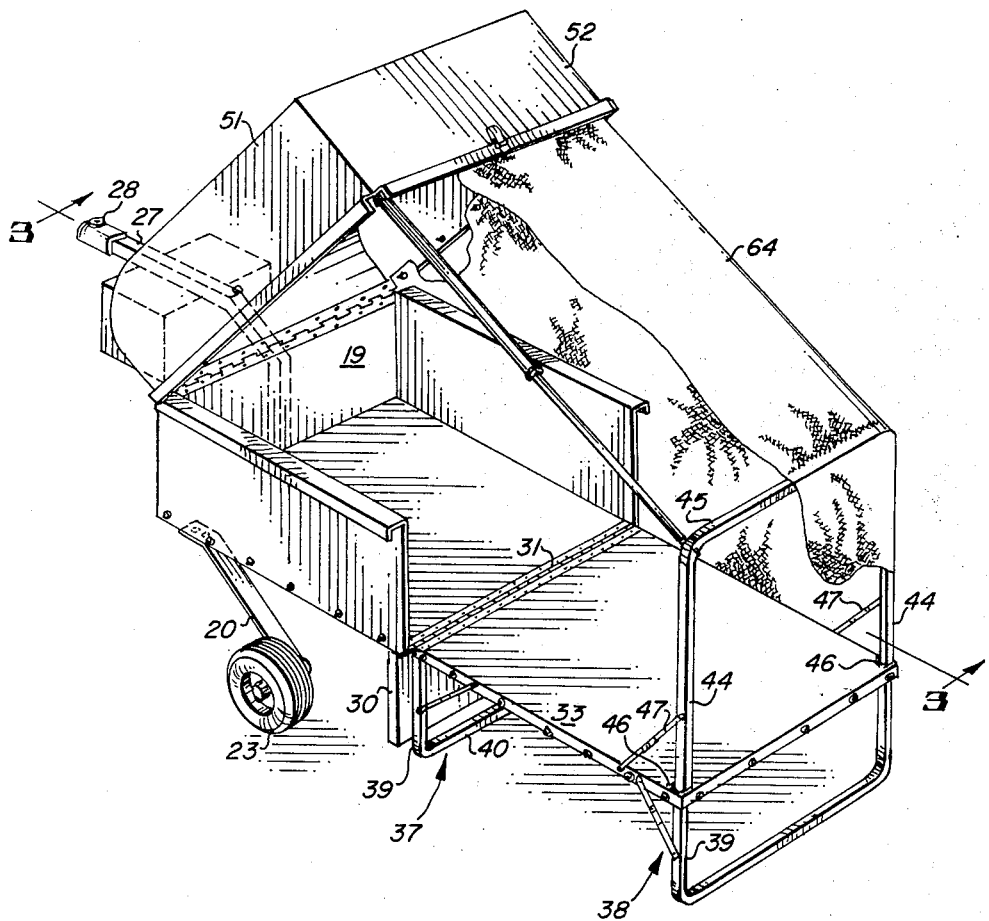
FIG. 2 is a perspective illustrating the trailer as opened and the canopy draped in effective position but with portions thereof omitted.

Referring now more particularly to FIGS. 2 and 3, a tailgate 30 is hingedly mounted to the rear edge of aluminum layer 13 of the floor by a hinge shown at 31. At this point it is well to note that aluminum layer 13 is continued rearwardly beyond plywood layer 14 and a bracket 32 is positioned on the upper side of layer 13 with a portion of the bracket being interposed between layers 13 and 14.

A platform 33 which also may be of plywood has one end secured to a hinge leaf 34 which is pivotally connected to the upper edge of bracket 32 by a hinge pin 35 (FIG. 4) which is removable. Tailgate 30 is provided with a tail light and turn indicators which are represented generally at 36 and which assume an effective position when tailgate 30 is swung upwardly into a position closing the rear end of lower member 12.

As shown more clearly in FIG. 2, a front leg assembly designated generally 37 is hingedly connected to the forward end of platform 33 and a rear leg assembly 38 is pivotally connected to the rear edge of platform 33. Each of the legs 37 and 38 is best described as a rectangularly shaped, closed loop presenting side legs 39 of a length providing for the cross bars 40 to engage the ground surface when platform 33 is in a horizontal position and thus support the platform. The hinge mountings of the leg assemblies 37 and 38 are shown at 41 in FIG. 3. A support 42 is provided at each side for each leg 39 and is of a well known conventional type comprising two sections which are pivotally connected with one end of one section being pivotally connected to a leg 37 and the other end to platform 33. When in the full line position of FIGS. 2 and 3, the supports 42 maintain legs 39 in the full line vertical position of FIG. 3, but may be "broken" to permit the leg assemblies 37 and 38 to be swung up into the broken line position of FIG. 3 and held in such position.

A vertical support referred to generally at 43 (FIG. 3) comprises a pair of struts 44 which are connected at the top by a cross bar 45. The lower ends of struts 44 are pivotally secured to the platform 33 adjacent to its rear edge as by hinges shown at 46. Supports 47 which are similar to the supports 42 hold the vertical support 43 in a vertical position as illustrated in FIG. 3 or permit it to be swung down flat against the upper face of platform 33.

Referring now to FIGS. 2 and 4, upper box-like member 11 which is also of sheet aluminum comprises a top 48, which is integrally joined to a front wall 49 (FIG. 1) by a rounded or bend portion 50, side walls 51 and a rear wall 52. The lower edges of side walls 51 are formed with outturned flanges 53 which terminate in downturned lips 54. Flanges 53 are dimensioned to overlie flanges 17 on the upper edges of side walls 16 of lower member 11 so as to cooperate therewith to form a moisture-proof seal. Similarly, the lower edge of rear wall 52 is formed with an outturned flange 55 which terminates in a downturned lip 56 which overlies the upper edge of tailgate 30 when the latter is in effective position to form a seal at this joinder.

Bend portion 50 of upper member 11 is provided with an eyelet 57 which cooperates with hook 29 to complete the detachable connection represented at 58 in FIG. 3 which holds the upper member 11 in the partially open or inclined position relative to bottom member 12. A pair of telescopic arms, one of which is shown in FIG. 3 and designated 59, is pivotally mounted on upper member 11 on side walls 51 just above the lower edges thereof and inside of rear wall 52. Each of these arms 59 comprises an inner section 60 and an outer section 61 which telescopes within section 60. Section 60 is pivotally mounted in the manner above described as indicated at 62 in FIG. 3. The outer end of each section 61 is formed as a pin 63 which is received in an opening in the upper end of vertical support 43. It is evident that sections 60 and 61 may be collapsed and swung inwardly into a position within upper member 11. Conversely, they may be swung outwardly, extended, and connected by pin 63 to the upper end of vertical support 43.

A canopy, a portion of which is shown at 64 in FIG. 2, may be rolled into the compact formation illustrated in FIG. 3 as represented by the broken line 65 and stored in the rear portion of upper member 11. It is secured in this position by a pair of straps, one of which is shown at 66, which has one end secured to top 48 as indicated at 67 and its other end to rear wall 52 by a snap fastener 68.

A padding of a material such as foam rubber or plastic is adapted to be placed on the plywood layer 14 of the bottom and over plywood platform 33 when the latter is folded out in its effective position as illustrated by the broken lines 69 in FIG. 3. This padding is rolled into compact formation represented by the broken lines 70 in the upper left hand portion of FIG. 3 and held in this position by a pair of elastic straps, one of which is shown at 71 and the ends of which are secured to top 48.

The inner faces of the side walls 51 of upper member 11 are provided with a plurality of the elements of snap fasteners as shown at 72 just above the lower edges of the side walls. Complemental elements of these snap fasteners are provided at appropriate points on canopy 64. The outer faces of the side walls 60 and of lower member 12 are also provided with a plurality of these snap fastening elements 72 just above the lower edges thereof. Likewise, the side and end edges of platform 33 are provided with fastening elements 72. Canopy 64 carries the complemental elements along the appropriate edge portions for cooperating with these elements 72.

A receptacle for carrying camping accessories is shown at 73 as being suspended from tongue 24.

OPERATION

In describing the mode of operation and manner of use of the subject trailer camper, it will first be assumed that the trailer in the condition of FIG. 1 is attached to a motorcycle by the hitch 28. The universal nature of the hitch 28 will enable the motorcycle to cant or tilt as it makes turns without seriously impairing the horizontal disposition of trailer 10. Moreover, the spring arms 20 adequately support the trailer due to the relatively small size thereof and afford good roadability.

In the closed position of FIG. 1, tailgate 30 is swung up into a vertical position closing the rear of the lower box-like member 12. In this position, the tail lights and turn indicators are visible from the rear. It will be understood that these electrical devices are connected by suitable wiring to the battery or ignition system of the motorcycle to which the trailer is hitched.

When it is desired to open up the trailer and use the equipment therein for camping or sleeping purposes, hitch 28 is left attached to the motorcycle and upper box-like member 11 swung on its hinge connection shown at 74 in FIG. 3 and represented by the removable hinge pin 75 in FIG. 4 and secured to tongue 24 by the detachable connection 58. Tailgate 30 is first swung down into the position of FIGS. 2, 3 and 4 in which it depends from the rear edge of the bottom 13 and 14. Platform 33 is then swung upwardly, rearwardly and downwardly about its hinged connection represented by hinge pin 35 into the position of FIG. 4. Leg assemblies 37 and 38 are then swung downwardly from the position of FIG. 4 into the position of FIG. 2 in which cross bars 40 which connect the lower ends of the legs 39 engage the ground surface. In this connection it is notable that the legs 39 have a height greater than the vertical extent of tailgate 30 when the latter is in its lowered position.

Vertical support 43 is then swung upwardly from the position of FIG. 4 into the position of FIGS. 2 and 3. Telescopic arms 59 are then swung downwardly and rearwardly and the sections thereof extended to permit the pins 63 at the ends of sections 51 to be received in the openings in the upper end of vertical support 43. Padding 69 is now removed from its stored, rolled condition in upper box-like member 11 and unrolled to cover the plywood layer 14 and platform 33. Canopy 64 is then removed from its rolled, stored position depicted in FIG. 3 and draped over telescopic arms 59 and vertical support 43. Canopy 64 will be cut and designed so that when in the draped position it covers that portion of the top that is defined by telescopic arms 59 and the open sides and end above the bottom 13–14 and platform 33. The elements of the snap fastener on the canopy are secured to their complemental elements 72 on upper member 11, lower member 12 and platform 33. It will be understood that the canopy will be formed with a flap or door at one side (not illustrated) to permit entrance into or exit from the space enclosed by the canopy.

If the trailer camper is designed to provide sleeping quarters for a single person, it is relatively narrow. However, to accommodate an additional person, only a small amount of increase in its width is necessary.

Should it be desired to use the trailer solely for cargo handling purposes, and a cover provided for protecting the cargo, platform 33 and the structure carried thereby is removed by simply withdrawing hinge pin 35. The rolled canopy represented at 65 and the rolled padding represented at 70 also are removed to provide greater space in the upper box-like member 11. Cargo may now be stored in the box-like members 11 and 12 and in this position will be adequately protected from weather conditions by the seals provided by flanges 17, 53 and 55.

Should it be desired to use the lower member 12 alone as an open top cargo carrier, upper box-like member 12 may be removed by removing hinge pin 75.

While a preferred specific embodiment is herein disclosed, it is to be clearly understood that the invention is not to be limited to the exact constructions, materials and devices illustrated and described because various modifications of these details may be provided in putting the invention into practice.

What is Claimed is:

1. In a trailer intended for attachment to a motorcycle,
   a. a lower box-like member comprising:
      i. a rectangular shaped bottom,
      ii. side walls upstanding from said bottom,
      iii. a front wall upstanding from said bottom, and
      iv. a tailgate pivotally connected to the rear edge of said bottom;
   b. a pair of springs secured to the underside of said bottom and a pair of wheels rotatably mounted on said springs;
   c. a tongue connected to said front wall and having a universal hitch at its forward end by which it is attached to a motorcycle;
   d. an upper box-like member having top, side, front and rear wheels, the lower edges of said front, side and rear walls of said upper member defining a rectangular space substantially corresponding to the shape defined by the upper edges of the front and side walls of said lower member;
   e. a hinge connection between the lower edge of the front wall of said upper member and the upper edge of the front wall of said lower member;
   f. elements of a detachable connection on said upper member and said tongue for maintaining said trailer in a partially open condition in which said upper member is inclined with respect to the horizontal, and
   g. seals between the lower edges of the side and rear walls of said upper member on the one hand and the upper edges of the side walls of the lower member and the tailgate on the other hand.

2. The trailer of claim 1 in which said seals comprise outwardly turned flanges on the lower edges of said side and rear walls of said upper member with a downturned lip at the edge of each of said flanges and outturned flanges on the upper edges of the side walls of said lower member and downturned lips on the edges of said last mentioned flanges.

3. The trailer of claim 1 in which the hinge connection between the front walls of the upper and lower members includes a removable hinge pin which permits the upper member from being disassembled from said lower member.

4. The trailer of claim 1, together with a receptacle for camping accessories suspended from said tongue.

5. The trailer of claim 1, together with a platform hingedly connected to the rear edge of the bottom of said lower member, said platform being dimensioned to accurately fit within said lower member and means to support said platform in a horizontal position extending from the rear edge of the bottom of said lower member.

6. The trailer of claim 5 in which said supporting means comprises a pair of leg assemblies pivotally secured to the opposite ends of said platform and breakable supports for maintaining said leg assemblies in vertical position.

7. The trailer of claim 6, together with a vertical support pivotally mounted at its lower end to the rear end of said platform when the latter is extended in horizontal position and having openings at the opposite sides of the upper end thereof; a pair of telescopic arms, each comprising inner and outer sections in telescopic relation, with the inner end of the inner section pivotally mounted on a side wall of said upper box-like member adjacent to the rear end thereof just above its bottom edge and within the rear wall of said upper member, the outer end of each outer telescopic section having a pin thereon which is received in one of said holes in said vertical support; a canopy stored in said upper member which is adapted to be draped over said telescopic arms and suspended from the lower edges of the side walls of said upper member; and means for securing the lower edges of said canopy in draped position to the lower edges of said walls of said lower member and side and end edges of said platform.

8. The trailer of claim 7 in which said means to secure said canopy in draped position to said upper and lower members of said platform takes the form of snap fasteners.

9. The trailer of claim 7 in which the hinge connection between the platform and the bottom of the lower box-like member includes a hinge pin which is removable to permit disassembly of said platform from said lower box-like member.

10. The trailer of claim 9, together with a pad of foam material which is positioned over the bottom of said lower member and said platform when extended and which when rolled in a compact state is stored in said upper member, together with means for maintaining said pad in said stored state.

* * * * *

UNITED STATES PATENT OFFICE
CERTIFICATE OF CORRECTION

Patent No. 3,823,975  Dated July 16, 1974

Inventor(s) Gene W. Cooper

It is certified that error appears in the above-identified patent and that said Letters Patent are hereby corrected as shown below:

IN THE CLAIMS:

Claim 1, line 2 of sub-paragraph "d", column 7, line 30, "wheels" should read -- walls --.

Signed and sealed this 3rd day of December 1974.

(SEAL)
Attest:

McCOY M. GIBSON JR.
Attesting Officer

C. MARSHALL DANN
Commissioner of Patents